United States Patent Office 3,354,101
Patented Nov. 21, 1967

3,354,101
PREPARATION OF ORGANOSILICON
COMPOUNDS
Thomas C. Williams, Lancaster, and George M. Omietanski, Tonawanda, N.Y., assignors to Union Carbide Corporation, a corporation of New York
No Drawing. Filed Dec. 29, 1964, Ser. No. 422,002
12 Claims. (Cl. 260—9)

This invention relates in general to a novel process for preparing organosilicon compounds. More particularly, the process of this invention consists of reacting a hydrosilicon compound with an active hydrogen atom containing compound in the presence of a positive halogen compound, which promotes the reaction, and an acid acceptor.

The term "hydrosilicon compound" is used herein to define a compound containing at least one silanic hydrogen atom, i.e. a hydrogen atom bonded directly to a silicon atom ($\equiv$Si—H). Such compounds include both hydrosilanes and hydrosiloxanes.

The term "active hydrogen atom containing" compound or simply "active hydrogen" compound is used in the present disclosure to define an organic compound having the ability to yield methane gas on treatment with methyl Grignard reagent. Such compounds belong to a well known class of compounds having a hydrogen atom which reacts with methylmagnesiumbromide to form methane according to the reaction.

$$R-H + CH_3MgBr \rightarrow R-MgBr + CH_4$$

There is a clear distinction between active hydrogen compounds as defined above and hydrosilicon compounds, since the hydrogen atom in the $\equiv$SiH grouping does not undergo this reaction. Carboxylic acids, amines, mercaptans, thioacids and compounds containing hydroxyl groups such as alcohols, silanols and siloxanols are illustrative active hydrogen compounds.

"Positive halogen" compounds are defined as materials in which a halogen atom is the positive end of a dipole in a molecule, and in which the remainder of the molecule is nucleophilic.

A variety of promoters or catalysts have been used in the past for the preparation of organosilicon compounds by the reaction of hydrosilicon compounds with active hydrogen compounds. For example, the reaction of hydrosilicon compounds with alcohols and carboxylic acids has been catalyzed by acids, e.g. sulfuric and hydroiodic acids, by bases such as amines, metal bases and metal salts, e.g. $H_2PtCl_6$, $ZnCl_2$, $NiCl_2$, $SnCl_2$ and $CoCl_2$. The reaction may be illustrated as:

$$\equiv SiH + HOR \xrightarrow{cat.} \equiv SiOR + H_2$$

An undesirable effect of this reaction, and one which is inherent in the use of the above-mentioned prior art catalysts is the release of hydrogen, a potentially dangerous gas. Moreover, all of these catalysts require relatively high reaction temperature in order that the reaction proceeds at reasonable rates. Other undesirable effects also result from use of the above catalysts. For example, the use of sulfuric acid gives poor yields and causes serious siloxane rearrangement, resulting in impure products. The above-mentioned bases are not suitable for reacting hydrosiloxanes, since hydride disproportionation and siloxane rearrangement occur. When metal catalysts such as copper are used, poor yields result even at high temperatures. When chloroplatinic acid is used as the catalyst, compounds containing vinyl unsaturation cannot be reacted because a competing reaction takes place, namely, addition of the silanic hydrogen material across the unsaturated double bond. In addition, chloroplatinic acid presents the same problem as the other metal salt catalysts, namely, that none of them can easily be separated from the products formed. This is a serious disadvantage since even trace amounts of residual catalyst tend to have a detrimental effect on the high temperature properties of the silicone materials produced.

Iodine alone or in combination with aluminum has also been used as a catalyst for the reaction of carboxylic acids and trialkysilanes. This reaction has the same general deficiencies as use of the previously mentioned catalysts, namely, that high temperature is required to promote the reaction and that hydrogen gas is evolved as a product of the reaction. If siloxanes are used in the reaction, rearrangement of the product will take place.

Formation of siloxanes by the reaction of silanols and hydrosilicon compounds is known. Catalysts for this reaction include metal salts, e.g. $H_2PtCl_6$, dialkyl tin diacylates, and metal oxides. This reaction is subject to the same limitations as those previously described, in that hydrogen gas is evolved as a product of the reaction and metal salt residues from the catalyst remain in the product, causing siloxane rearrangement. Furthermore, use of chloroplatinic acid leads to side reactions with compounds containing carbon-to-carbon unsaturation.

It is an object of this invention to provide an improved method for reacting hydrosilicon compounds with active hydrogen atom containing compounds by the use of an improved promoter for the reaction.

It is another object of this invention to prepare organosilicon compounds by reacting a hydrosilicon compound and an active hydrogen atom containing compound by a reaction which proceeds rapidly at relatively low temperatures, which does not release hydrogen gas, and which is not subject to undesirable side reactions such as rearrangement, disproportionation or double bond addition.

These and other objects are accomplished by a novel process for the preparation of organosilicon compounds which comprises reacting (1) a hydrosilicon compound and (2) an active hydrogen atom containing compound, in the presence of (3) a positive halogen compound having a molecular weight greater than 19 and (4) an acid acceptor. The reaction can be illustrated by the following simplified equation which emphasizes the reacting moieties involved in the invention:

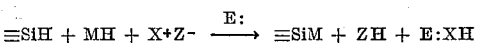

$$\equiv SiH + MH + X^+Z^- \xrightarrow{E:} \equiv SiM + ZH + E:XH$$

In the above formula $\equiv$SiH represents a hydrosilicon compound, MH represents the active hydrogen atom containing compound, $X^+Z^-$ is a positive halogen compound, E: is an acid acceptor, $\equiv$SiM is the reaction product sought to be made, ZH is the reaction product of a hydrogen atom and the nucleophilic portion of the positive halogen compound, and E:XH is the product of the hydrogen halide formed during the reaction and the acid acceptor.

The present method makes possible the production of organosilicon compounds having a predetermined structure or distribution of units in a copolymer. It has numerous advantages over prior art methods of preparing organosilicon compounds from hydrosilicon compounds and active hydrogen atom containing compounds. These advantages include (1) a rapid reaction even at low temperatures (2) no hydrogen gas evolution during the reaction, (3) elimination of side reactions even where olefinic unsaturation is present and (4) elimination of rearrangement or disproportionation of the products formed. An additional advantage results from the fact that no metallic salts are used which can remain in the product. Such metallic salt residues, which often remain from prior art metal catalysts, are very difficult to remove since they are not volatile.

The hydrosilicon compounds suitable for use in the present invention include both hydrosilanes and hydrosiloxanes which contain at least one silanic hydrogen atom. Such compounds may be monomeric or polymeric; linear, branched or cyclic in structure, and may contain from one silicon bonded hydrogen atom to any greater number of silicon bonded hydrogen atoms per molecule. Any one silicon atom may contain from one to four hydrogen atoms bonded directly to it. The remaining valence bonds of the silicon atom (that is, those not bonded either to hydrogen or oxygen atoms) may be satisfied with substituted or unsubstituted, saturated or olefinically unsaturated, aliphatic or aromatic hydrocarbons, or with functional groups. The functional groups may be bonded either directly to the silicon atom or be substituted on the above-mentioned hydrocarbon groups. The functional groups may include for example, alkoxy, aryloxy, acyloxy, oxirano, cyano, fluoro, amino, amido, hydroxy, carboxy and acyl groups. If the functional group contains an active hydrogen atom, such as an OH or $NH_2$ group, it may take part in the reaction.

The hydrosilanes that are useful in the present invention are represented by the formula:

(A)                  $R_xSiH_{4-x}$ where R is selected from the group consisting of (a) a monovalent hydrocarbon group, (b) a monovalent functionally substituted hydrocarbon group, and (c) a monovalent functional group, and $x$ represents any whole number from 1 to 3 inclusive. The monovalent hydrocarbon groups may be the same or different, and may be saturated or olefinically unsaturated, and either aliphatic or aromatic or mixtures thereof. The functional groups attached to the Si atom, as well as the functional groups on the hydrocarbon groups, may be any of those mentioned in the paragraph above.

The hydrosiloxanes that are useful in the present invention include those that are composed essentially of groups having the repeating formula:

(B)

where R is the same as defined above, $a$ has a value of 1 to 3 inclusive, $b$ has a value of 0 to 2 inclusive, and $(a+b)$ has a value of 1 to 3 inclusive.

Hydrosiloxanes that are useful in the present invention also include copolymers composed of units represented by formula B above and units represented by Formula C below, wherein the ratio of (B) to (C) can be from 700:1 to 1:700, preferably from 100:1 to 1:100 and most preferably from 10:1 to 1:10. The molecular weight of such copolymers may range from about 200 for a low viscosity fluid to several million for gums. Formula C is:

(C)                  $R_cSiO_{4-c/2}$ where R is defined as above, and $c$ has a value of 0 to 3 inclusive.

As noted above, R in Formulas A, B and C may be any monovalent hydrocarbon group, i.e. an alkyl, alkenyl, aryl, alkaryl or aralkyl group. Illustrative of such alkyl groups are methyl, ethyl, propyl, butyl, octadecyl, cyclohexyl and cyclopentyl groups. Illustrative of such alkenyl groups are vinyl, butenyl, cyclopentenyl and cyclohexenyl. Illustrative of such aryl groups are phenyl and naphthyl groups; illustrative of alkaryl groups are tolyl and xylyl; illustrative of aralkyl groups are benzyl and beta-phenylethyl. Suitable illustrative substituents on the hydrocarbon groups are alkoxy, aryloxy, acyloxy, oxirano, cyano, fluoro, amino, amido, hydroxy, carboxy, and acyl groups.

A preferred class of polymers composed of units represented by Formulas B and C above may be represented by the formula:

(D)           $R_3'SiO(R_2'SiO)_x(R'HSiO)_ySiR_3'$ where R' represents any monovalent hydrocarbon group, for example, methyl, ethyl, propyl, cyclohexyl, phenyl, vinyl, tolyl, benzyl. Where more than one R' group is attached to any particular silicon atom they may be the same or different groups. Preferably R' is a saturated hydrocarbon group; the methyl group being the most preferred. The value of $x$ can be any average value from 0 to about 10,000, $y$ can be any average value from 1 to about 10,000, and the ratio of $x$ to $y$ can be from 700:1 to 1:700.

For example, if in Formula D, $x=0$, $y=1$ and all R's are methyl, the siloxane, hereafter labeled Siloxane I is:

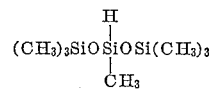

If in Formula D, $x=12.8$, $y=2.6$ and all R's are methyl, the siloxane, hereafter labeled Siloxane II is:

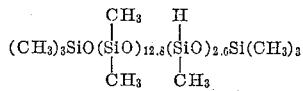

It will be apparent to those skilled in the art that the repeating siloxane units may be varied from those shown in the preferred embodiment of Formula D above, and that equivalent repeating siloxane units may be substituted for those shown. For example, trifunctional repeating units such as $RSiO_{1.5}$ may be used to replace some or all of the $R_2SiO$ units, and to replace some of the HRSiO units, without departing from the basic concepts of this invention. Furthermore, other types of units such as silcarbane, polysilane and silazane units may also form parts of the copolymer. The methods for preparing such copolymeric polysiloxanes are well known in the art.

Additional illustrative examples of specific hydrosilicon compounds useful in this invention are: $SiH_4$, $Me_3SiH$, $Ph_2SiH_2$, $MePhSiH_2$, $MeEtSiH_2$, $Me_2SiH_2$, $PhSiH_3$
$C_5H_{11}SiH_3$, $Si_3H_3$, $SiH(OMe)_3$, $MeSiH_3$
$Me(CH_2=CHCH_2)_2SiH$, $(C_6H_{11})_3SiH$, $MeHSi(OEt)_2$
$Et_3SiH$, $CH_2=CHMe_2SiH$, $MeOCH_2Me_2SiH$
$CF_3CH_2CH_2MeSiH_2$, $Me_3SiOSiMe_2H$
$Me_3Si(MeHSiO)_3SiMe_3$, $(MeHSiO)_4$, $(Me_3SiO)_3SiH$
$(HMe_2Si)_2O$, $(Me_2SiO)_3(PhHSiO)$, $(EtOMeHSi)_2O$

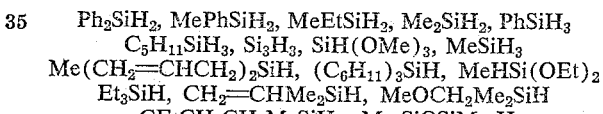

$Me_3SiO(H_2SiO_4SiMe_3$, $[(EtO)_2HSi]_2O$, $(H_2SiO)_4$
$HMe_2SiPhSiMe_2H$ and the like. The terms Me, Et and Ph are used to designate the methyl, ethyl and phenyl groups respectively.

The "active hydrogen atom containing" compounds or "active hydrogen" compounds which are useful in this invention are compounds including carboxylic acids, amines, mercaptans, thioacids and compounds containing hydroxyl groups such as water, alcohols, polyols, silanols and siloxanols.

Substantially any monomeric alcohol whether aliphatic or aromatic may be used as the active hydrogen atom containing compound in the present invention. Such an alcohol may be represented by the formula R''OH where R'' is any monovalent organic radical, e.g. a hydrocarbon radical or a functionally substituted hydrocarbon radical. The following radicals are illustrative of R'': methyl, ethyl, t-butyl, cyclohexyl, octadecyl, allyl, propargyl, phenyl, benzyl, tolyl, 2,2,2-trifluoroethyl and bromophenyl.

Useful polyols may contain 2, 3, 4 or any higher number of hydroxyl groups. The polyols may be monomeric or polymeric. Illustrative polyols include 1,2-ethanediol, 1,2-propanediol, 1,4-butanediol, glycerol, pentaerythritol, sorbitol, sucrose, glycerol started polyalkylene oxides, sorbitol started polyalkylene oxides, glycol terminated polyesters, hydroxy terminated polyalkylene oxides, and polyvinylalcohol.

Carboxylic acids suitable as the active hydrogen atom containing compound include both monocarboxylic and polycarboxylic acids. Illustrative acids include formic, acetic, propionic, butyric, valeric, capric, lauric, stearic, benzoic, methoxyacetic, trifluoroacetic, phthalic, salicylic, cinnamic, acrylic, maleic, oxalic, malic, adipic, oleic, linoleic, linolenic, tartaric, glutamic, gluconic, lactic, pyruvic, ascorbic and angelic.

The silanols which are useful active hydrogen atom containing compounds include both monomeric and polymeric materials. The monomeric silanols represented by the average formula $R_f(OH)_gSiE'_{4-(f+g)}$ where R has the same meaning as defined above, $f$ is an integer from 0 to 3 inclusive, $g$ is an integer from 1 to 3 inclusive and $(f+g)$ may not be greater than 4, and E' is selected from the group consisting of alkoxy, aralkoxy, acyloxy and fluoro groups. Specific suitable groups from which E' may be selected are methoxy, ethoxy, phenoxy and acetoxy. Illustrative silanols are $PhMe_2SiOH$, $Et_3SiOH$, $Me_3SiOH$, $PhSi(OH)_3$ and $Ph_2Si(OH)_2$.

The siloxanols which are suitable active hydrogen atom containing compounds in the present invention are represented by the average formula:

where R is defined as above, E' is defined as above, $h$ has a value of from 0 to 2.5 inclusive, $i$ has a value of from 0 to 2.5 inclusive, $k$ has a positive value not greater than 3, and $(h+i+k)$ is from .8 to 3. It is essential that each siloxane molecule contain at least one hydroxyl group attached to a silicon atom. The siloxanols may be monomeric, homopolymeric or copolymeric, and may be linear, branched or cyclic in structure. Their molecular weight may range up to $1 \times 10^6$ or even higher. The polymeric materials may also contain silicarbane, silazane, or polysilane units. Illustrative examples of useful siloxanols include $HO(Me_2SiO)_3H$, $(HOPhMeSi)_2O$,

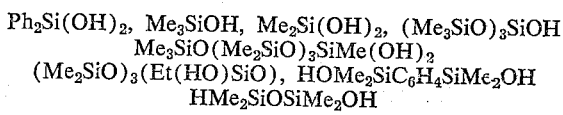

and $(MeHSiO)_3(Me(HO)SiO)$. The terms Me, Et, Ph are the same as previously defined.

Other active hydrogen atom containing compounds include primary and secondary amines ($RNH_2$ and $R_2NH$), mercaptans (RSH), and thioacids (ROCSH). In each of the above formulas R has the same meaning as above. Illustrative amines are: aniline, diphenyl amine, piperidine, morpholine, ethylamine, t-butyl amine, t-octyl amine and diethyl amine; illustrative mercaptans are: t-butyl mercaptan and ethyl mercaptan; illustrative thioacids are: thioacetic acid and thiobenzoic acid.

Positive halogen compounds, as noted before, are defined as materials in which the halogen is the positive end of a dipole in a molecule in which the remainder of the molecule is a nucleophile. Examples include: alkyl hypohalites, e.g. t-butyl hypochlorite; acyl hypohalites, e.g. acetyl hypobromite; N-haloamines, e.g. N,N-dichloro-t-butylamine; N-haloamides, e.g. N,N-dibromobenzenesulfonamide, N,N - dichlorobenzenesulfonamide, N - bromoacetamide, N - chloroacetamide, N - haloimides, e.g. N - chlorophthalimide, N - chlorosuccinimide, N-bromosuccinimide, 1,3 - dichloro - 5,5 - dimethylhydantoin, 1-bromo - s - triazine - 2,4,6(3H, 5H) - trione (bromoisocyanuric acid); 1-haloalkynes, e.g. 1-bromohex-1-yne; α-halocarbonyl compounds, e.g. 2,2-dibromomalonic ester, 3,3-dichloropentane-2,4-dione, halonitromethanes, e.g. chlorotrinitromethane, dibromodinitromethane; halocyanomethanes, e.g., bromotricyanomethane; halomethanes, e.g. bromotrifluoromethane; haloacylmethanes; activated haloaromatic compounds, e.g. 2,4,6-trinitrochlorobenzene; nitryl halides; sulfenyl halides, e.g. trichloromethanesulfenylchloride. The molecular halogens and interhalogen compounds excluding molecular fluorine are also useful as sources of positive halogen: $Cl_2$, $Br_2$, $ClBr$, $BrI$ as well as the inorganic hypohalites e.g. $NaOBr$, $Ca(OCl)_2$, $LiOCl$.

Other suitable positive halogen compounds are oxyalkylyene hypohalites, which are represented by the formula:

where R''' is X or R (a monovalent hydrocarbon) as defined above, X is a halogen having an atomic weight greater than 19, $n$ has a value of from 2 to 4 and $x$ has a value of from 1 to about 100; preferably $n$ is 2 or 3. Copolymers where $n$ is a mixture of ethylene and propylene units are also suitable.

Use of an acid acceptor is essential if one wishes to obtain a clear cut reaction substantially free of side products. Useful acid acceptors include pyridine, picoline, collidine, quinoline, sodium acetate, t-butylacetate, magnesium and the like. Although amines of certain types, e.g. triethylamine react rapidly with positive halogen compounds and compete with the reaction of silanic hydrogen compounds, they also may be used if they are introduced after the positive halogen compound has been added to a mixture of organosilicon hydride and an active hydrogen atom containing compound.

The ratio of reactants, as well as other reaction conditions such as time, temperature, pressure and use of solvent are not critical and may therefore be varied within wide limits.

With added active hydrogen atom containing compounds, the positive halogen compound promotes the formation of the derivative of the added active hydrogen compound with almost complete exclusion of the product which would normally be formed from the positive halogen compound and the silanic hydrogen compound. Even with equimolar amounts of the added active hydrogen compound, hydrosilicon compound and positive halogen compound substantially no product from the reaction of positive halogen compound and the hydrosilicon compound is formed.

The hydrosilicon compound and the protolytic compound can be used in any ratio whatsoever, the chosen ratio depending on the effect desired or product sought. The preferred molar ratio of the three reactants (i.e. hydrosilicon, positive halogen and active hydrogen containing compounds) is 1:1:1. If either the hydrosilicon compound or active hydrogen compound is in excess, a 1:1 molar ratio of positive halogen compound to the limiting reagent is preferred. With either in excess, it is not necessary that they be incorporated into the product, the excess reagent may serve as a solvent or diluent.

The positive halogen compound and the hydrosilicon compound can be used in any molar ratio depending on the effect desired or product sought. A 1:1 molar ratio is preferred since an excess of the positive halogen compound may lead to side reactions, such as undesirable halogenation. A deficiency of the positive halogen compound results in incomplete reaction. However, this may be desirable, for example, when preparing compounds containing both SiH and SiOtBu groups, e.g.

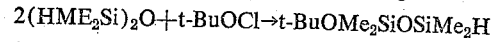

Another instance where this is desirable is in the production of a copolymer containing both silanic hydrogen and hydroxyl. The following reaction is illustrative:

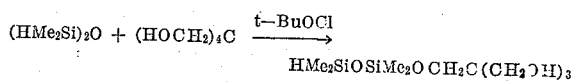

If there is a deficiency of active hydrogen atom containing compound, and a 1:1 molar ratio of the other two reactants, a product containing both the added active hydrogen compound and units that result from the reaction of the positive halogen compound and the hydrosilicon compound will result. An example is the following reaction:

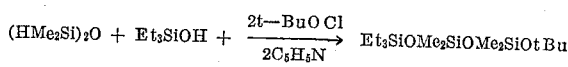

A preferred range of molar ratios of hydrosilicon compound to active hydrogen compound is from 1:10 to 10:1.

Any sequence of mixing may be used for the reactants. The positive halogen compound should be added cautiously as the reaction may be highly exothermic. If an acid acceptor, e.g. pyridine, is used it is preferable to avoid prior mixing of it and the positive halogen compound, as premature side reactions may occur. The preferred orders of mixing are (1) the addition of the positive halogen compound to a mixture of the hydrosilicon compound, active hydrogen compound and acid acceptor or (2) addition of the positive halogen compound to a mixture of the hydrosilicon compound and the active hydrogen compound followed by addition of the acid acceptor.

Inert solvents are not required, but may be used if desired, especially for making reactants compatible and for moderating those reactions which occur very rapidly and exothermically. Any organic solvent which does not contain active hydrogen atoms may be used. Such solvents include aliphatic and aromatic hydrocarbons, ketones, esters, nitriles and ethers. The preferred solvents are the hydrocarbons, e.g. hexane, benzene and toluene.

The process of this invention may be carried out over a wide range of conditions. It may be accomplished at temperatures ranging from $-100°$ C. to $200°$ C., the only limit being the decomposition temperature of the reactants, especially the positive halogen compound. Pressures above, below or at atmospheric may be used. The preferred reaction condition is at atmospheric pressure and at a temperature in the range of from $-78°$ C. to about $50°$ C.

Reaction time varies depending upon the reactants and proportions thereof, as well as the temperature and pressure used. With t-butyl hypochlorite as the positive halogen compound, the reaction appears to be essentially instantaneous even at $-78°$ C. Some of the other positive halogen compounds, e.g. N-chlorophthalimide, gave a noticeable reaction at room temperature only after several days.

In order to more fully describe the invention, the following examples are given by way of illustration only, and are not intended to limit the scope of the invention.

Examples I through IV illustrate the preparation of organosilicon esters; Examples V to XIII illustrate the preparation of organosiloxanes; and Examples XIV illustrates the preparation of a silanol—all prepared in accordance with the methods of this invention.

*Example I.—Reaction of* $HSiMe(OSiMe_3)_2$ *and* $MeOH$ 54.15 g. t-butyl hypochlorite were added dropwise over a one hour period to a cooled ($-10°$ C.) solution containing: 16 g. anhydrous methanol, 111 g. 3-H-heptamethyltrisiloxane, 39.5 g. pyridine and 150 ml. anhydrous ether. The reaction vessel was protected from light with aluminum foil. After stirring 4 hours and then standing overnight, the reaction mixture was filtered and distilled. The product was identified as 82.4 g. of 3-methoxy-heptamethyltrisiloxane $(Me_3SiO)_2MeSiOMe$. It has the following properties: B.P. $82°/47$ mm. Hg, $n_D^{25}$ 1.3832, and $d_4^{25}$ 0.8618.

*Example II.—Reaction of*

$$Me_3SiO(MeHSiO)_{2.6}(Me_2SiO)_{12.8}SiMe_3 \text{ and } EtOH$$

To a cooled (5 to 15° C.) solution containing: 88.3 g. ethanol, 150 g. $Me_3SiO(MeHSiO)_{2.6}(Me_2SiO)_{12.8}SiMe_3$, 27.6 g. pyridine, and 200 ml. of benzene, there was added dropwise over a one hour period 34.7 g. t-butyl hypochlorite. During the reaction, the constituents were guarded from light. After an additional hour of stirring, the mixture separated into two phases. The entire mixture was concentrated in a rotary evaporator at 0.1 mm. Hg and 25° C. before the pyridine hydrochloride was filtered off. Final purification in a rotary evaporator at 50° C. and 0.1 mm. Hg followed by filtration gave 152.9 g. of a colorless liquid which was identified as:

$$Me_3SiO[Me(EtO)SiO]_{2.6}(Me_2SiO)_{12.8}SiMe_3$$

It had the following properties: $n_D^{25}$ 1.4010, $d_4^{25}$ 0.9706, viscosity 32.4 centistokes at 25° C. and pour point $-135°$ F. to $-140°$ F.

*Example III.—Reaction of*

$$Me_3SiO(MeHSiO)_{2.6}(Me_2SiO)_{12.8}SiMe_3$$

*and* $CH_3COOH$ 34.7 g. t-butyl hypochlorite were added dropwise over an hour's time to a cooled (5 to 15° C.) solution containing: 150 g. $Me_3SiO(MeHSiO)_{2.6}(Me_2SiO)_{12.8}SiMe_3$, 115.2 g. acetic acid, 27.6 g. pyridine and 200 ml. benzene. The reactants were shielded from light with aluminum foil. After standing overnight, two layers formed and were separated. The lower layer was discarded. The upper layer was concentrated in a rotary evaporator at 50° C. and 0.1 mm. Hg and then filtered. 153.7 g. of a colorless product resulted having the following properties: $n_D^{25}$ 1.4042, $d_4^{25}$ 1.0084, viscosity 45.3 centistokes. The product was identified as:

$$Me_3SiO[Me(AcO)SiO]_{2.6}[Me_2SiO]_{12.8}SiMe_3$$

The product as a 2.6% solution in benzene was used to water-proof cotton cloth. After heating 10 minutes at 160° C., the cloth showed good water repellency.

*Example IV.—Reaction of*

$$Me_3SiO(MeHSiO)_{2.6}(Me_2SiO)_{12.8}SiMe_3$$

*and* $n-BuO(C_2H_4O)_{19.7}(C_3H_6O)_{14.9}H$ 10.85 g. of t-butyl hypochlorite were added dropwise to a cooled (5 to 10° C.) solution containing: 500 ml. ether, 150 ml. benzene, 180.8 g. anhydrous polyether mono-ol, 7.9 g. pyridine, and 48.8 g.

$$Me_3SiO(MeHSiO)_{2.6}(Me_2SiO)_{12.8}SiMe_3$$

Aluminum foil was used to protect the reaction vessel from light. The mixture was filtered, concentrated on a rotary evaporator at 25° C./0.1 mm. Hg, sparged with dry nitrogen at 180° C. and refiltered. The product was 224.3 g. of a copolymer having the following properties: $n_D^{25}$ 1.4452 and viscosity 2000 centistokes. This product was identified as:

$$Me_3SiO(Me[n-BuO(C_2H_4O)_{19.7}(C_3H_6O)_{14.9}]SiO)_{2.6}(Me_2SiO)_{12.8}SiMe_3$$

*Example V.—Reaction of* $HSiMe(OSiMe_3)_2$ *and* $Et_3SiOH$ 59.3 g. of t-butyl hypochlorite were added dropwise over a 2 hour period to a cooled solution containing: 111.0 g. 3-H-heptamethyltrisiloxane, 66.0 g. triethylsilanol, 39.5 g. pyridine and 150 ml. anhydrous ether. The exothermic reaction was maintained below 0° C. by cooling with a Dry Ice-acetone bath. The reaction vessel was wrapped with aluminum foil to keep out light. After stirring for 6 hours, 500 ml. of distilled water were added to the mixture to extract the pyridine hydrochloride. The ether layer which was separted from the aqueous layer, was dried with anhydrous sodium sulfate and distilled. It yielded 121.6 g. of 3-triethylsiloxyheptamethyl-trisiloxane, $Et_3SiOSiMe(OSiMe_3)_2$ having the following properties: B.P. $50°/0.25$ mm. Hg, $n_D^{25}$ 1.4050 and $d_4^{25}$ 0.8641.

*Example VI.—Reaction of* $Me_3SiO(Me_2SiO)_3H$ *and* $(Me_3SiO)_2MeSiH$ 5.5 g. of t-butyl hypochlorite were added dropwise to a cooled ($-10°$ C.) solution containing: 11.1 g. 3-H-heptamethyltrisiloxane, 15.2 g. nonamethyltetrasiloxan-1-ol, 4.0 g. pyridine and 200 ml. anhydrous ether. Reaction time was 30 minutes. Aluminum foil was used to shield the reactants from light. The mixture was washed with water and dried over anhydrous calcium sulfate. Distillation gave 23.7 g. of 3-trimethylsiloxytridecamethylhexasiloxane, $(Me_3SiO)_2MeSiO(Me_2SiO)_3SiMe_3$ having the following properties: B.P. 75–80°/0.1 mm. Hg, $d_4^{25}$ 0.8955 and $n_D^{25}$ 1.3931.

*Example VII.—Reaction of $Et_3SiH$ and $MeSiO(Me_2SiO)_3H$*

10.85 g. of t-butyl hypochlorite were added dropwise over a period of one hour to a cooled mixture (−10° to 0° C.) containing: 31.26 g. nonamethyltetrasiloxan-1-ol, 11.6 g. triethylsilane, 7.9 g. pyridine and 100 ml. benzene. Light was excluded by covering the reaction vessel with aluminum foil. After stirring for an additional hour, the mixture was allowed to stand overnight and then washed with water, dried over potassium carbonate and distilled to give 31.0 g. of 1,1,1-triethylnonamethylpentasiloxane, $Et_3SiO(Me_2SiO)_3SiMe_3$ having the following properties: B.P. 76–78°/0.1 mm. Hg, $n_D^{25}$ 1.4050, and $d_4^{25}$ 0.8844.

*Example VIII.—Reaction of $(C_6H_5)_2Si(OH)_2$ and $(Me_3SiO)_2MeSiH$*

Dropwise addition of 21.7 g. of t-butyl hypochlorite over a period of one hour to a cooled mixture (−10 to 0° C.) containing: 21.6 g. diphenylsilanediol, 44.4 g. 3-H-heptamethyltrisiloxane, 15.8 g. pyridine, and 500 ml. anhydrous ether gave an exothermic reaction. Reactants were protected from light. After standing overnight the mixture was washed with water, dried over anhydrous calcium sulfate, concentrated and filtered. The oil was distilled to give 37.0 g. of a product having the following properties: B.P. 138–160°/0.1–0.3 mm. Hg, $n_D^{25}$ 1.4546 and $d_4^{25}$ 0.9798.

A vapor phase chromatogram of the product showed two major constituents which were collected and identified by infrared analysis as 5,5-diphenyl-3,7-bis-trimethyl-siloxyoctamethylpentasiloxane, $(C_6H_5)_2Si[OSiMe(OSiMe_3)_2]_2$ and 1,1 - diphenyl-3-trimethylsiloxytetramethyltrisiloxan-1-ol, $(C_6H_5)_2Si(OH)OSiMe(OSiMe(OSiMe_3)_2$.

*Example IX.—Reaction of $HSiMe(OEt)_2$ and $Me_3SiO(Me_2SiO)_3H$*

21.7 g. of t-butyl hypochlorite were added dropwise over 30 minutes to a cooled (−20° to 0° C.) solution containing: 26.8 g. methyldiethoxysilane, 62.5 g. nonamethyltetrasiloxane-1-ol, 15.8 g. pyridine and 100 ml. benzene. The reactants were protected from light. After stirring for two hours, the mixture was allowed to stand overnight. Pyridine hydrochloride was removed by filtration. Distillation gave 67.5 g. of 1,1-diethoxydecamethylpentasiloxane, $Me_3SiO(Me_2SiO)_3MeSi(OEt)_2$ having the following properties: B.P. 70°/10 mm. Hg, $n_D^{25}$ 1.3928 and $d_4^{25}$ 0.9234.

*Example X.—Reaction of $Et_3SiOH$ and $Me_3SiO(MeHSiO)_{2.6}(Me_2SiO)_{12.8}SiMe_3$*

10.9 g. of t-butyl hypochlorite was added dropwise over a one hour period to a cooled solution (−20° to −10° C.) containing: 13.2 g. triethylsilanol, 48.8 g.

$Me_3SiO(MeHSiO)_{2.6}(Me_2SiO)_{12.8}SiMe_3$ 7.9 g. pyridine and 100 ml. anhydrous ether. The reactants were safeguarded from light during the reaction. After standing overnight, the mixture was washed with water and dried over anhydrous calcium sulfate. Extraction with acetone-methanol followed by concentration on a rotary evaporator resulted in a clear yellow product having the following properties: $n_D^{25}$ 1.4119, M.W. 2900, viscosity 93 centistokes and pour point −109 to −114° F. The product was identified as a polymer containing pendant triethylsiloxy groups.

*Example XI.—Reaction of $HMe_3SiO(Me_2SiO)_{23.8}Me_2SiH$ and $HO(Me_2SiO)_{57.2}H$*

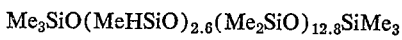
23.7 g. $HMe_2SiO(Me_2SiO)_{23.8}Me_2SiH$ and 53.1 g. $HO(Me_2SiO)_{57.2}H$ in 150 ml. of benzene were reacted in the presence of 2.7 g. t-butyl hypochlorite and 2.0 g. pyridine. Light was excluded during the reaction. After standing overnight, the mixture was washed with water, dried over anhydrous potassium carbonate, and concentrated on a rotary evaporator. The product had a viscosity of 2730 centistokes at 25° C. and $n_D^{25}$ 1.4030.

*Example XII.—Reaction of $(CH_2=CH)Me_2SiH$ and $HO(Me_2SiO)_{306}H$*

A mixture containing 1750 g. $HO(Me_2SiO)_{306}H$, 15.0 g. dimethylvinylsilane, and 13.8 g. pyridine was cooled to 15° C. Then 18.9 g. of t-butyl hypochlorite were added dropwise to the mixture at a rate which maintained the temperature at 15 to 19° C. The reaction was exothermic. After filtering, a clear product resulted which was identified as $CH_2=CHMe_2SiO(Me_2SiO)_{306}SiMe_2CH=CH_2$.

*Example XIII.—Reaction of $Et_3SiH$ and $H_2O$*

To −10° C. solution containing: 34.8 g. triethylsilane, 5.4 g. water, 23.7 g. pyridine and 200 ml. acetone, there were added over a two hour period 21.7 g. t-butyl hypochlorite. Light was excluded during the reaction. The mixture was washed with water, dried over anhydrous sodium sulfate and concentrated. After redrying, the product was distilled to give 13.4 g. of triethylsilanol having the following properties: B.P. 62°/10 mm. Hg, $n_D^{25}$ 1.4312 and 19.4 g. hexaethyldisiloxane B.P. 108°/10 mm. Hg, and $n_D^{25}$ 1.4315.

*Example XIV.—Reaction of $Et_3SiH$ and $H_2O$ (1:10)*

32.55 g. t-butyl hypochlorite were added dropwise over a two hour period to a cooled solution containing: 34.8 g. triethylsilane, 54.0 g. water, 23.7 g. pyridine, and 500 ml. acetone. The reaction was very exothermic. Aluminum foil was used to protect the reaction vessel from light. 200 ml. of ether were added to the mixture and the layers separated. The organic phase was washed with six 100 ml. portions of brine, two 100 ml. portions of saturated sodium bicarbonate, and two 100 ml. portions of brine, and then dried over anhydrous sodium sulfate. Thereafter, it was distilled to give 24.8 g. of triethylsilanol, $Et_3SiOH$ having a B.P. 71–72°/20 mm. Hg, and $n_D^{25}$ 1.4310.

*Example XV.—Positive halogen compounds as curing agents for filled room temperature vulcanization systems*

To a mixture of 43.7 g. $HO(Me_2SiO)_{306}H$, 26.3 g. silica filler, 2.10 g. $Me_3SiO(Me_2SiO)_9(MeHSiO)_{3.5}SiMe_3$ and 0.64 g. pyridine, there was added 1.58 g. of 1,3-dichloro-5,5-dimethyl-hydantoin (DCH). The mixture was molded by conventional methods. After one hour the molded article was substantially cured.

With t-butyl hypochlorite in the above system, curing occurred before the material could be molded.

*Example XVI.—Positive halogen compounds as promoters for the cure of gums*

70 g. of dimethylsiloxane gum having a bulk viscosity of about 500,000 cp. and modified with methylhydrosiloxane units such that it contained 0.03 mole of MeHSiO/kg. was placed on a roll mill, and 10 drops of water were added. 0.3 g. of t-butyl hypochlorite were then added. After a few minutes of mixing, one half of the material was molded. The other half was placed on the mill, and 5 drops of pyridine were added. After mixing, the second half was also molded. With t-butyl hypochlorite alone very little cure had occurred after ten days, but with the same promoter in the presence of pyridine curing occurred in about one hour.

Similarly, with 0.3 g. of 1,3-dichloro-5,5-dimethyl-hydantoin (DCH) in place of the t-butyl hypochlorite in the above formulation, no cure occurred without an acid acceptor present. In the presence of added pyridine, the gum became cured. Strips of the molded compound without pyridine were exposed separately to atmospheres of ammonia and pyridine. The former caused cure within a half hour while the latter caused cure overnight. Use of 1,3-dibromo-5,5-dimethylhydantoin (DBH) in the above formulation also resulted in curing of the gum. These room temperature curing compositions may be stored without curing at temperatures below room temperature.

Table I below demonstrates the use of positive halogen compounds as curing promoters for room temperature vulcanization (RTV) systems. Fourteen positive halogen compounds were tested as promoters for the reaction of various dimethylmethylhydrosiloxane fluids and hydroxyl group containing compounds. Gelation time was used as the measure of curing rate. The compounds used and their abbreviations are as follows:

t-Butyl hypochlorite (t-BuOCl)
N,N-dibromobenzenesulfonamide (DBB)
N,N-dichlorobenzenesulfonamide (DCB)
1,3-dibromo-5,5-dimethylhydantoin (DBH)
1,3-dichloro-5,5-dimethylhydantoin (DCH)
N-bromoacetamide (NBA)
N-chloroacetamide (NCA)
N-bromosuccinimide (NBS)
N-chlorosuccinimide (NCS)
N-chlorophthalimide (NCP)
Trichloroisocyanuric acid (TCC)
Dichloroisocyanuric acid (DCC)
Potassium dichloroisocyanuric acid (KDCC)
and trichloromethanesulfenylchloride (TMSC).

Test formulation A consists of:

| | G. |
|---|---|
| $Me_3SiO(MeHSiO)_6(Me_2SiO)_{15}SiMe_3$ | 27.3 |
| $HO(ME_2SiO)_{10.7}H$ | 40.5 |
| and | |
| $C_5H_5N$ (pyridine) | 7.9 |

Test formulation B consists of:

| | |
|---|---|
| $Me_3SiO(MeHSiO)_{2.6}(Me_2SiO)_{12.8}SiMe_3$ | 1 |
| and | |
| $HO(Me_2SiO)_{16.8}H$ | 1 |

Test formulation C consists of:

| | |
|---|---|
| $Me_3SiO(MeHSiO)_6(Me_2SiO)_{15}SiMe_3$ | 27.3 |
| $HOCH_2CH_2OH$ | 3.1 |
| and | |
| $C_5H_5N$ (pyridine) | 7.9 |

TABLE I

| | Formulation A | Gelation Times, Formulation B (days) | Formulation C |
|---|---|---|---|
| (1) t-BuOCl | Inst.[1] | 1 | Inst.[1] |
| (2) DBB | 2 min | (2) | 1 min. |
| (3) DCB | 30 sec | (2) | 30 sec. |
| (4) DBH | Inst.[1] | (2) | Inst.[1] |
| (5) DCH | 30 sec | (2) | 2 min. |
| (6) NBA | Inst.[1] | (2) | Inst.[1] |
| (7) NCA | 4 days | | 4 days. |
| (8) NBS | 30 sec | 1 | 2 min. |
| (9) NCS | 4 days | 4 | None. |
| (10) NCP | ....do | (2) | Do. |
| (11) TCC | 4 hours | (2) | Inst.[1] |
| (12) DCC | 2 min | (2) | 2 min. |
| (13) KDCC | 4 days | (2) | 4 days. |

[1] Instantaneous. [2] Not tested.

The results in Table I demonstrate that room temperature vulcanization of silicone gums and rubber stock is feasible, in accordance with the methods of this invention and that curing time may be controlled by proper selection of the positive halogen compound and acid acceptor. As will be apparent to those skilled in the art, such vulcanizable silicone compositions may contain any of the conventional additives such as, fillers, pigments, antioxidants and solvents.

Suitable fillers and pigments include, for example, titanium dioxide, zinc oxide, iron oxide, lithpone, silica, metal silicates, diatomaceous earth, calcium carbonate, fume silica, silica aerogel, glass fibers, etc. The amount of filler or pigment used may vary widely depending upon the use for the cured silicone rubber as well as the type of filler used. In general, the amount of filler may vary from 0 to 300% by weight of filler based upon the weight of the polysiloxane.

Suitable solvents include, for example, benzene, toluene, xylene, chlorobenzene, dibutyl ether and methylisobutyl ketone. The amount of solvent used may vary widely depending upon the viscosity desired for the curable composition, which in turn depends upon its ultimate use.

*Example XVII.—Positive halogen compounds in the treatment of cotton cloth*

Five pieces of cotton cloth weighing about 5 g. each were placed in a solution of 5 g.

$$Me_3SiO(MeHSiO)_{40}SiMe_3$$

and 1.6 g. pyridine. After standing one hour, one piece of cloth was removed and then placed in a solution containing 100 ml. of benzene and 0.4 g. of t-butyl hypochlorite for three minutes and then air dried. The cloth showed some water repellency (spray rating 50—) and after being heated for three minutes at 160° C. showed improved water repellency (spray rating 50+). A second piece of silicone treated cloth was placed in the above t-butyl hypochlorite solution and allowed to remain there an hour. After air drying, it had a spray rating of 50+. Similarly, a fresh solution of the t-butyl hypochlorite was used for the treatment of a third piece of silicone treated cloth. After standing two hours in the hypochlorite solution, the cloth was air dried and found to have a spray rating of 50+. The fourth piece of silicone treated cloth was allowed to stand in a solution containing 0.4 g. of 1,3-dichloro-5,5-dimethylhydantoin in 100 ml. of benzene. After air drying, this sample showed some water repellency (spray rating 50—) which was unchanged after three minutes at 160° C. The fifth piece of silicone treated cloth was removed from the initial mixture without treatment with a positive halogen compound and air dried. It showed no water repellency.

Although the above tests were conducted on cotton cloth, it will be apparent to those skilled in the art that other substrata containing active hydrogen atoms can also be rendered water repellent in accordance with the method described in Example XVII above. That is, substrata containing active hydrogen atoms may be rendered water repellent by treatment with a hydrosilicon compound in the presence of a positive halogen compound and an acid acceptor.

Suitable substrata containing active hydrogen atoms include cellulosic fibers, paper, animal fibers such as wool, proteinaceous materials such as leather and silk, synthetic fibers such as those made of polyvinylalcohol, polyacrylates, polyesters and nylon and inorganic substrata containing material such as silica, quartz, glass, particularly glass fibers, alumina, clay and asbestos.

As will be apparent to those skilled in the art, the products of this invention have various utilities. For example, the products of Examples II and X have good low temperature properties, viz. freezing points of −135° F. and 109° F., respectively thus making them useful as dielectric coolants and low temperature hydraulic fluids.

Polymers with acetoxy- or ethoxy-groups attached to silicon were prepared in Examples II, III and IX. These groups and other similar groups, e.g. methoxy, which are useful as reactive points in the preparation of organosilicon materials, may be introduced at known sites in a polymer. The acetoxy fluid of Example III is useful for imparting water repellency to cotton cloth and as a crosslinking agent in room temperature vulcanizable siloxane materials. Other utilities of acetoxyorganosilicon compounds are well known. An ambient temperature curing system using tin salt catalysis was prepared from the product of Example II, a hydroxysiloxane and filler. Material from Example V gave a good flexible polyurethane foam with 60–65 cells/inch when used as the polyol without added surfactant. Furthermore, it acted as a surfactant when added to polyurethane foam formulations in place of conventional surfactants.

The preparation of a silanol from a hydrosilicon compound and water as the protolytic material is illustrated in Example XIV. Use of a large excess of water suppresses the further possible reaction of the silanol with additional hydrosilicon compound to form a siloxane, e.g.

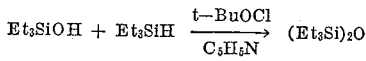

The latter is the principal reaction when a 1:1 ratio of water to triethylsilane was used as shown in Example XIII.

In addition, the process of this invention provides an improved method for bringing about ambient temperature polymerization and "curing" of organosiloxane materials both with and without filler. As shown in Table I, a variety of positive halogen compounds cause curing at different rates varying from instantaneous to ten days. Thus, room temperature vulcanization systems, which do not require atmospheric moisture and which have reasonable pour and cure times can be prepared.

Example XVI demonstrates that silicon gums containing minor amounts of silanic hydrogen can be cross-linked by positive halogen compounds and water at room temperature; presumably by the following reaction:

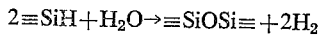

Example XII illustrates that it is possible to convert a high molecular weight dimethylsiloxane fluid having terminal hydroxy groups to one endblocked with dimethylvinylsiloxy units through the use of dimethylvinylsilane, by use of the t-butyl hypochlorite promoted reaction in the presence of pyridine. Treatment of the above fluid with dimethylvinylsilane in the presence of a tin salt was ineffective. Other silicone fluids and gums may be endblocked using this procedure.

A commercial process for achieving water repellency on cotton cloth consists of treating the cloth with a methylhydrosiloxane fluid and a tin salt curing catalyst at high temperature. t-Butyl hypochlorite and other positive halogen compounds can be used to promote the curing of the methylhydrosiloxane fluids at room temperature; thus, as shown in Example XVII cotton cloth can be rendered water repellent at room temperature and without the need for any metal catalysts.

Other possible uses for the process of this invention include coating of fillers, preparation of silicon alkyd resins, sizing of paper and the like.

What is claimed is:

1. A process for preparing organosilicon compounds which comprises reacting
   (I) a hydrosilicon compound selected from the group consisting of
      (1) hydrosilanes represented by the formula:

(A) $$R_xSiH_{4-x}$$

wherein R is selected from the group consisting of a monovalent hydrocarbon group, a monovalent functionally substituted hydrocarbon group, and a monovalent functional group wherein the above functional group and functional substituents are selected from the class consisting of alkoxy, aryloxy, acyloxy, oxirano, cyano, fluoro, amino, amido, hydroxy, carboxy and acyl groups; and wherein $x$ represents an integer of from 1 to 3 inclusive; and
      (2) hydrosiloxanes composed essentially of groups having the formula:

(B) 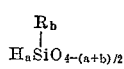

wherein R is the same as defined above; $a$ represents an integer from 1 to 3 inclusive; $b$ represents a value of from 0 to 2 inclusive; and $(a+b)$ represents an integer of from 1 to 3 inclusive; and
      (3) hydrosilicon copolymers composed of units represented by the Formula B above and units represented by the formula:

(C) $$R_cSiO_{4-c/2}$$

wherein the ratio of (B) to (C) can range from 700:1 to 1:700; and wherein R is the same as defined above, and $c$ has a value of from 0 to 3 inclusive; and
   (II) an active hydrogen atom containing compound selected from the group consisting of carboxylic acids, amines, mercaptans, thioacids, water, monomeric alcohols, polyols, silanols, and siloxanols, in the presence of
   (III) an acid acceptor selected from the group consisting of pyridine, picoline, collidine, quinoline and triethylamine; and
   (IV) a positive halogen compound having an atomic weight greater than 19 in which a halogen atom is the positive end of a dipole in a molecule in which the remainder of the molecule is nucleophilic.

2. A process as defined in claim 1 wherein the hydrosilicon compound is represented by the formula:

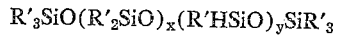

wherein R' is a saturated monovalent hydrocarbon group, $x$ has any average value from 0 to about 10,000, $y$ has any average value from 1 to about 10,000 and the ratio of $x$ to $y$ is from 700:1 to 1:700.

3. A process as defined in claim 1 wherein the positive halogen compound is an oxyalkylene hypohalite represented by the formula:

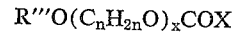

wherein R''' is selected from the group consisting of a halogen atom having an atomic weight greater than 19 and a monovalent hydrocarbon group, X is a halogen atom having an atomic weight greater than 19, $n$ has a value of from 2 to 4 and $x$ has a value of from 1 to about 100.

4. A process as defined in claim 1 wherein the hydrosilicon compound is

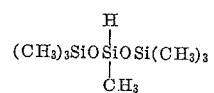

5. A process as defined in claim 1 wherein the hydrosilicon compound is

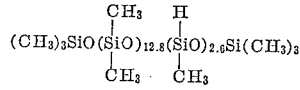

6. A process as defined in claim 1 wherein the positive halogen compound is t-butyl hypochlorite.

7. A process as defined in claim 1 wherein the reaction is carried out in the presence of an inert organic solvent which is free of active hydrogen atoms selected from the group consisting of aliphatic hydrocarbons, aromatic hydrocarbons, ketones, esters, nitriles, and ethers.

8. A process as defined in claim 1 wherein the reaction is carried out at a temperature ranging from −100 to 200° C. at about atmospheric pressure.

9. A process as defined in claim 1 wherein the reaction is carried out at a temperature ranging from −78 to 50° C.

10. A composition capable of curing at room temperature comprising (a) a hydrosilicon gum convertible to an elastomer; (b) an active hydrogen atom containing compound selected from the group consisting of carboxylic acids, amines, mercaptans, thioacids, water, monomeric alcohols, polyols, silanols, and siloxanols; (c) an acid acceptor selected from the group consisting of pyridine, picoline, collidine, quinoline, and triethylamine and (d) a positive halogen compound having an atomic weight greater than 19 in which a halogen atom is the positive end of a dipole in a molecule in which the remainder of the molecule is nucleophilic.

11. A composition as defined in claim 10 which contains, in addition, a filler.

12. A composition as defined in claim 10 wherein the hydrosilicon compound is a dimethylsiloxane gum modified with methylhydrosiloxane units such that it contains 0.03 mole of $CH_3HSiO$ per kilogram.

References Cited

UNITED STATES PATENTS

| | | | |
|---|---|---|---|
| 2,532,622 | 12/1950 | Hunter | 260—209 |
| 2,588,393 | 3/1952 | Kauppi | 260—46.5 |
| 3,011,987 | 12/1961 | Walton et al. | 260—9 |
| 3,177,178 | 4/1965 | Bluestein | 260—46.5 |
| 3,186,967 | 6/1965 | Nitzsche et al. | 260—46.5 |

WILLIAM H. SHORT, *Primary Examiner.*

E. M. WOODBERRY, *Assistant Examiner.*